Sept. 19, 1944.  R. B. SUMMERS  2,358,606
SEGMENTAL WASHER
Filed Oct. 5, 1942

INVENTOR
Robt. B. Summers
BY
ATTYS

Patented Sept. 19, 1944

2,358,606

UNITED STATES PATENT OFFICE 2,358,606

SEGMENTAL WASHER

Robert B. Summers, Stockton, Calif.

Application October 5, 1942, Serial No. 460,736

10 Claims. (Cl. 85—51)

This invention relates in general to an improved metallic washer, and in particular the invention is directed to, and it is my principal object to provide, a unique form of segmental washer of the type adapted for use on bolts or the like, where it is advantageous to apply the washer to the bolt without fully unthreading the nut therefrom, and which may not be feasible, due to stripped threads, rust, etc. This type of washer is especially useful in connection with the maintenance of bolt-connected structures such as railroad bridges or trestles, wherein the nuts frequently cannot be fully unthreaded and lack of thread on the bolt does not permit the nut to be tightened unless a washer is interposed between such nut and the adjacent structure. The segmental washer as hereinafter described can be applied to the bolt merely by backing the nut part way off so as to expose a portion of the shank of the bolt and then applying the washer segments thereabout; the segments matching and cooperatively engaging to form a complete washer.

Another object of the instant invention is to provide a segmental washer wherein matching segments are formed with unique cooperating surfaces to assure proper fit and frictional engagement of the segments, and to maintain said segments against separation radially of the bolt when the washer is in use in surrounding relation thereto.

An additional object of the invention is to provide a segmental washer wherein the segments are designed for matching cooperating engagement; the engaged surfaces of the segments including a plurality of taper portions in unique assembly.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
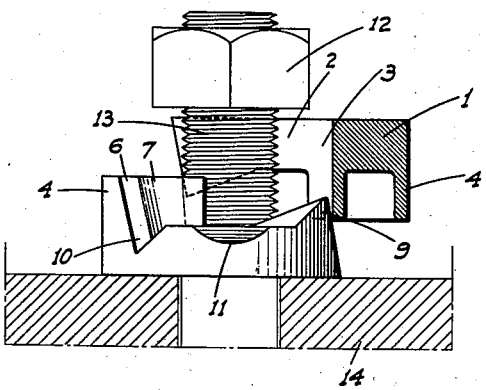
Figure 1 is a side elevation showing one segment in place about a bolt, and the other segment, partly in section, being moved into place about the bolt.
Figure 2:
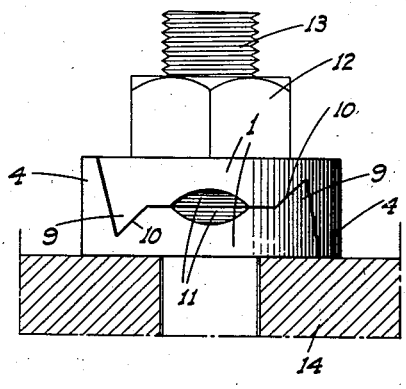
Figure 2 is a side elevation of the segmental washer surrounding a bolt and clamped in place between the nut and the adjacent structure.
Figure 3:
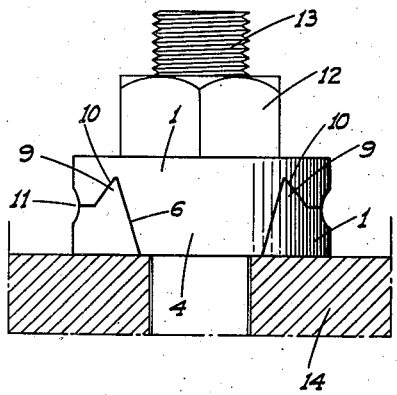
Figure 3 is an end elevation taken 90° from the elevation of Fig. 2, showing the segmental washer in use.
Figure 4:
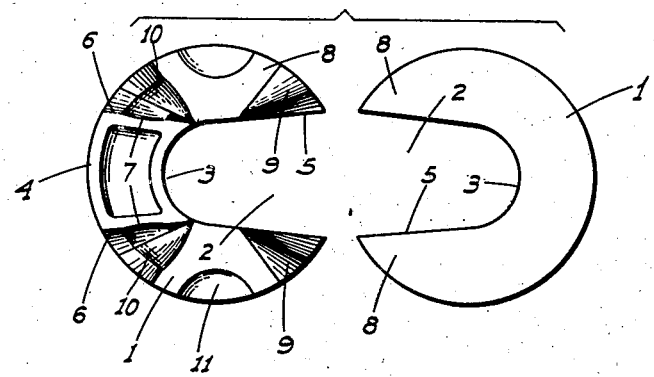
Figure 4 is a top plan view of the segmental washer with the segments separated in a radial direction.

Referring now more particularly to the characters of reference on the drawing, my improved segmental washer comprises a pair of identical segments indicated at 1, generally U-shaped in plan, normally disposed in face-to-face matching relation to form a complete circular washer. The throats 2 of the segments are tapered and open to the peripheries thereof in opposite directions, and the inner ends of said throats are semi-circular as at 3, whereby when the segments are matchingly engaged said throats adjacent their inner ends define a circular opening for the bolt.

Each segment between the inner end 3 of the throat and the corresponding portion of the periphery of said segment is formed with a segmental axially projecting boss 4; the bosses, when the segments are matchingly engaged, projecting into the outer and open end of the throat of the other segment. As the bosses 4 project axially from the segments a distance the average thickness thereof, said bosses at their outer ends are flush with the flat outer faces of the segments when the same are engaged, and complete the circle of each segment; the radially outer side of the bosses being curved and on the same radius as the segments.

In order to assure that the segments remain in proper matching relation when in use, and especially against separation radially of the bolt, I employ the following arrangement:

The sidewalls 5 of the throat of each segment, from the curved inner end 3 to the periphery of the segment, extend radially of the washer in slightly diverging relation, while the opposite sidewalls 6 of the bosses matchingly diverge. In addition, the sidewalls 6 of the bosses also converge somewhat axially of the washer and toward the outer end of said bosses, and the radially divergent sidewalls 5 of the throats of the segments are also divergent axially of the washer to match the axial convergence of sidewalls 6 of said bosses. These sidewalls 6 are formed in combination with the radial divergence and axial divergence thereof, with a certain amount of concavity 7 which assures proper frictional engagement and mating of the sidewalls 5 therewith.

At their outer ends the legs 8 of each segment are formed with axial projections or ribs 9 which extend, when the segments are in matching engagement, toward the other segment and seat in symmetrically-formed grooves 10 at the base and on opposite sides of the boss 4 of said other segment. The projections are each generally V-shaped in cross section and taper inwardly from the periphery of said segments, feathering out short of the corresponding boss. The inner faces of the projections 9 are in effect axial continuations of the sidewalls 5 and are flat therewith. As the projections 9 seat in grooves 10 when the segments are matchingly engaged, there cannot be any radial separation of the segments unless axial separation first occurs.

On opposite sides the washer is formed with prying slots 11 for reception of a tool to axially separate the segments when necessary. In use, the above described segmental washer is employed in the following manner:

The nut 12 on the bolt 13 is unthreaded to back it away some distance from the adjacent structure 14. Thereafter the segments of the washer, while in axially separated relation, are engaged with the bolt from opposite sides and then the segments are brought together axially into frictional engagement, which locks the same against radial separation. Thereafter the nut 12 is run down against the washer and tightened.

From the foregoing description it will be readily seen that I have produced such a device as substantially fulfills the objects of the invention as set forth herein.

While this specification sets forth in detail the present and preferred construction of the device, still in practice such deviations therefrom may be resorted to as do not form a departure from the spirit of the invention, as defined by the appended claims.

Having thus described my invention, what I claim as new and useful and desire to secure by Letters Patent is:

1. A segmental washer comprising a pair of like segments, generally U-shaped in plan, said segments opening in opposite directions and being disposed in face-to-face matching engagement, a boss formed integral with and projecting axially from and beyond the face of each segment in closing relation into the open end of the other segment, the outer end of each boss being flush with the outer face of the other segment, and means releasable only upon axial separation of the segments frictionally securing the same against radial separation.

2. A segmental washer comprising a pair of like segments, generally U-shaped in plan, said segments opening in opposite directions and being disposed in face-to-face matching engagement, a segmental boss projecting axially from and beyond the face of each segment opposite the open end of the latter and in the direction of the other segment, said bosses projecting into the outer and open end of the throat of said other segments, the sidewalls of the throat of each segment extending in outwardly diverging relation radially of the washer, opposite sidewalls of the bosses matchingly diverging and being frictionally engaged by said sidewalls of the throat, and means releasable only upon axial separation of the segments frictionally securing the same against radial separation.

3. A segmental washer as in claim 2 in which said opposite sidewalls of the bosses are convergent axially of the washer toward the outer end of said bosses, and said radially divergent sidewalls of the throats of the segments are likewise divergent axially of the washer to match said axial convergence of said opposite sidewalls of said bosses.

4. A segmental washer comprising a pair of like segments, generally U-shaped in plan, said segments opening in opposite directions and being disposed in face-to-face matching engagement, a segmental boss projecting axially from and beyond the face of each segment opposite its open end and in the direction of the other segment, said bosses projecting into the outer and open end of the throat of said other segment, and means releasable only upon axial separation of the segments frictionally securing the same against radial separation.

5. A segmental washer comprising a pair of like segments, generally U-shaped in plan, said segments opening in opposite directions and being disposed in face-to-face matching engagement, a segmental boss projecting axially from and beyond the face of each segment opposite its open end and in the direction of the other segment, said bosses projecting into the outer and open end of the throat of said other segment, and axial projections on each segment on opposite sides of and adjacent the open end of its throat, said projections extending toward the other segment, said other segment having symmetrically formed grooves at the base and on opposite sides of the corresponding boss, said projections seating in matching relation in said grooves.

6. A segmental washer comprising a pair of like segments, generally U-shaped in plan, said segments opening in opposite directions and being disposed in face-to-face matching engagement, a segmental boss projecting axially from each segment opposite its open end and in the direction of the other segment, said bosses projecting into the outer and open end of the throat of said other segment, and axial projections on each segment on opposite sides of and adjacent the open end of its throat, said projections extending toward the other segment, said other segment having symmetrically formed grooves at the base and on opposite sides of the corresponding boss; said projections seating in matching relation in said grooves, being generally V-shaped in cross section, tapering inwardly from the periphery of the segments lengthwise of the corresponding throat, and feathering out short of the corresponding boss.

7. A segmental washer as in claim 6 in which adjacent faces of the projections are continuations of the sidewalls of the corresponding throat and are flat therewith.

8. A segmental washer comprising a pair of like segments generally U-shaped in plan, said segments opening in opposite directions and being disposed in face-to-face matching engagement, a segmental boss projecting axially from and beyond the face of each segment opposite its open end and in the direction of the other segment, said bosses projecting into the outer and open end of the throat of said other segment, the sidewalls of the throat of each segment frictionally engaging adjacent their outer ends with opposite sidewalls of the adjacent boss, said opposite sidewalls of the adjacent boss being concave, and means releasable only upon axial separation of the segments frictionally securing the same against radial separation.

9. A segmental washer comprising a pair of like segments generally U-shaped in plan, said segments opening in opposite directions and being disposed in face-to-face matching engagement, a segmental boss projecting axially from each segment opposite its open end and in the direction of the other segment, said bosses projecting into the outer and open end of the throat of said other segment, the sidewalls of the throat of each segment frictionally engaging adjacent their outer ends with opposite sidewalls of the adjacent boss, the engaged portions of said sidewalls of the throat and opposite sidewalls of the adjacent boss diverging radially of the washer toward its periphery and converging axially of the washer toward the outer end of said boss, and means releasable only upon axial separation of the segments frictionally securing the same against radial separation.

10. A segmental washer comprising a pair of like segments generally U-shaped in plan, said segments opening in opposite directions and being disposed in face-to-face matching engagement, a segmental boss projecting axially from each segment opposite its open end and in the direction of the other segment, said bosses projecting into the outer and open end of the throat of said other segment, the sidewalls of the throat of each segment frictionally engaging adjacent their outer ends with opposite sidewalls of the adjacent boss, the engaged portions of said sidewalls of the throat and opposite sidewalls of the adjacent boss diverging radially of the washer toward its periphery and converging axially of the washer toward the outer end of said boss, and means releasable only upon axial separation of the segments frictionally securing the same against radial separation; said means comprising axial projections on each segment extending along opposite sides of and adjacent the open end of its throat, said projections being V-shaped in cross section and protruding toward the other segment, said other segment having symmetrically formed V-shaped grooves at the base and on opposite sides of the corresponding boss, said projections seating in matching relation in said grooves.

ROBERT B. SUMMERS.